United States Patent [19]
Cotter

[11] 3,939,482
[45] Feb. 17, 1976

[54] WRITING APPARATUS

[76] Inventor: William L. Cotter, P.O. Box 2045, Salem, Mass. 01970

[22] Filed: Mar. 28, 1974

[21] Appl. No.: 455,737

[52] U.S. Cl.................. 346/139 C; 33/18 R; 118/7; 118/76
[51] Int. Cl.² ........................................ G01D 15/24
[58] Field of Search..... 346/139 R, 139 C; 33/18 R; 401/55, 103; 118/7, 76, 238

[56] References Cited
UNITED STATES PATENTS

| | | | |
|---|---|---|---|
| 2,316,906 | 4/1943 | Wait.............. | 346/139 C X |
| 2,361,049 | 10/1944 | Oakes................... | 33/32 D |
| 2,375,267 | 5/1945 | Wise .................... | 346/139 C |
| 2,484,298 | 10/1949 | Krahulec.............. | 346/139 C X |
| 2,811,101 | 10/1957 | Devol................... | 101/1 |
| 2,865,330 | 12/1958 | Swank................. | 401/103 X |
| 3,058,220 | 10/1962 | Eary...................... | 33/32 C |
| 3,145,070 | 8/1964 | Miller et al. ........... | 346/29 |
| 3,293,658 | 12/1966 | Sicking.................. | 346/139 R |
| 3,578,897 | 5/1971 | Stock..................... | 178/5.2 |
| 3,643,334 | 2/1972 | Gelb et al. ............ | 33/18 R |
| 3,857,525 | 12/1974 | Gerber et al......... | 242/57.1 |

FOREIGN PATENTS OR APPLICATIONS 554,308    6/1943    United Kingdom................. 346/140

*Primary Examiner*—Joseph W. Hartary
*Attorney, Agent, or Firm*—Wolf, Greenfield & Sacks

[57] ABSTRACT

An apparatus that may be used in an automatic drawing system for recording, for example, with pencil lead or ink. In one embodiment using a pencil lead, a push rod connects to a piston which is slideable in a cylinder which has a retaining tube for the lead extending therefrom. Air pressure may be selectively applied to the piston for urging the rod against the lead which is in turn contacting the medium for recording thereon. Retraction of the lead from contact with the medium is performed by a mechanism that moves the cylinder and retaining tube toward the medium after the air pressure has been removed so that the lead slides into the tube, and thereafter moves the cylinder and tube away from the medium to retract the lead from contact with the medium. Detection means are also provided to detect the expending of the lead and a multi-lead holder is indexed so that a new piece of lead is registered with the push rod.

21 Claims, 6 Drawing Figures

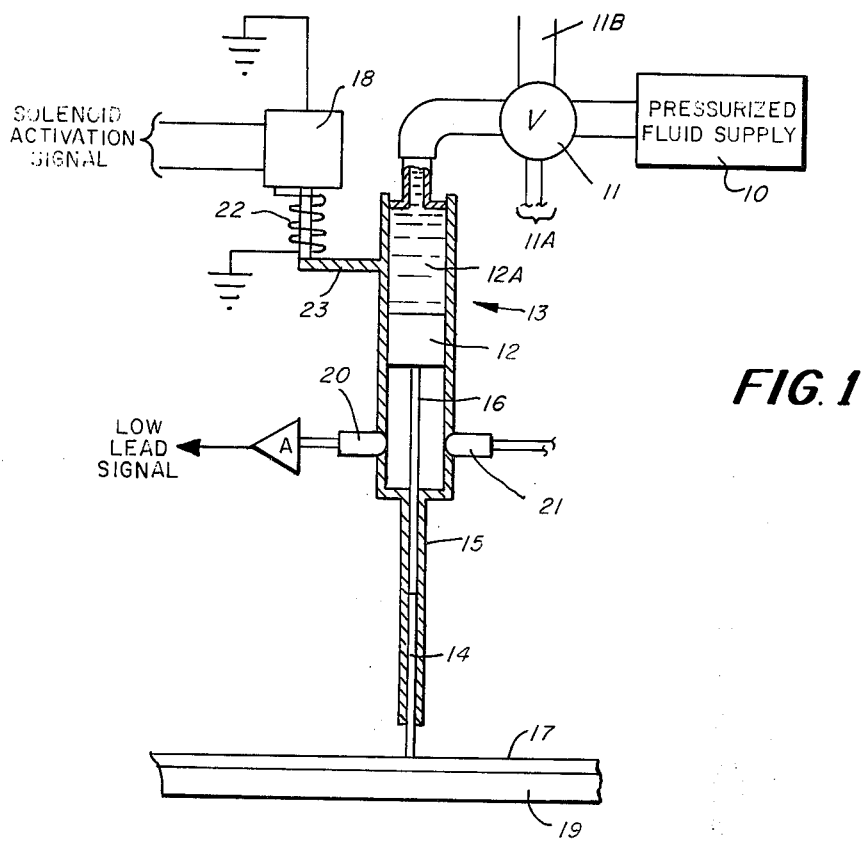
FIG. 1
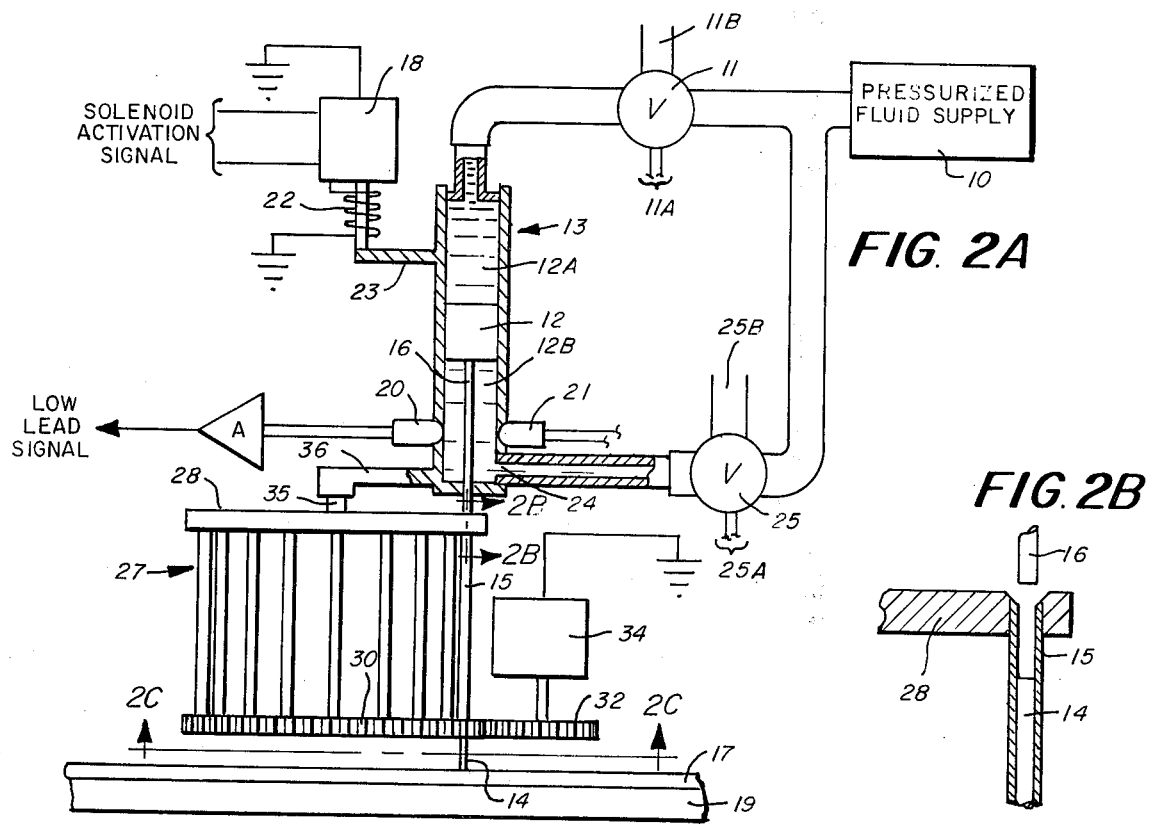
FIG. 2A
FIG. 2B

WRITING APPARATUS

FIELD OF THE INVENTION

The present invention relates to a recording apparatus and associated method of recording data on a recording medium. In general, the invention may be used where it is desired to selectively apply a recording material or substance to a recording medium under preferably constant pressure.

The recording material in the preferred embodiment comprises a pencil lead, but the techniques disclosed herein are equally applicable with other recording materials such as with an electronic stylii as may be used in facsimile recording or an ink stylii as used in constant pressure recording techniques.

BACKGROUND OF THE INVENTION

There are many instances in the recording field where it is desirable to apply a recording material to a recording medium such that the recording material contacts the medium with constant pressure even though the recording material is expended during the recording process. It is desirable that the contact between the recording material and medium be selectively interrupted so that the recording device may pass over areas of the recording medium where no recording or marking is to take place.

The prior art discloses many devices that teach techniques for obtaining the above desired operation. These prior art techniques vary depending on the recording material used. Where the recording material is a pencil lead various mechanical techniques have been used including mechanisms for chucking the lead and then feeding the lead under spring tension or using a special chucking mechanism with a screw arrangement or motor to feed the lead.

In the facsimile field where the recording material is an electronic stylus, similar problems occur as the tip of the stylus wears and must be fed at a constant pressure to obtain long life. In that application similar techniques have been used such as spring tension to maintain constant pressure contact. These techniques suffer from mechanical complexity and other disadvantages. If spring tension is used to maintain constant pressure contact then either the throw of the spring must be limited or the spring tension must be released when it is desirable to remove contact with the recording medium. In addition, where it is desired to have a long travel of the recording material, such as when using lead which wears rapidly, springs have a limited travel length for a constant pressure application. Where mechanical means are used to advance the lead such as a screw-motor arrangement, a major disadvantage is that only one lead may be placed in the mechanism at a time. The thin leads used in automatic drawing applications wear at an extremely high rate, and the number of feet of drawn line is limited especially when softer leads are used.

Accordingly, one object of the present invention is to provide an apparatus which allows for long periods of unattended operation and that accommodates multiple pieces of lead. The apparatus of the present invention automatically changes to a new lead as the previous lead is expended.

Another object of the present invention is to provide an apparatus and method for feeding a recording material onto a recording medium under constant pressure.

A further object of the present invention is to provide means for selectively removing contact between the recording material and medium. This object is performed in accordance with the present invention without undue mechanical complexity.

Another object of the present invention is to provide an apparatus for feeding pencil lead that permits the use of a plurality of pieces of lead to thereby provide long unattended operation.

SUMMARY OF THE INVENTION

To accomplish the foregoing and other objects of this invention there is provided an apparatus for writing or marking on a medium by means of a marking material. The apparatus comprises means for retaining the marking material, means contacting the marking material for urging the marking material against the medium, means for supporting the contacting means, and means for applying a constant pressure to the contacting means to in turn apply a constant pressure to the marking material. To interrupt the writing or marking process means are provided for selectively moving the support means toward and away from the medium to withdraw the marking material from the medium.

In one embodiment utilizing pencil lead, the lead is retained in a long tube with an inside diameter slightly larger than the lead diameter. A pushrod contacts the lead and is slideable in the tube. This rod connects to a piston enclosed in a penumatic cylinder. If pressure is applied to the end of the piston opposite the pushrod, the rod is urged against the lead in the retaining tube and the lead is expelled from the other end of the tube until it comes into contact with the recording medium. The rod maintains a pressure against the tip of the recording material; the pressure being a product of the pneumatic pressure in the cylinder and the piston area. As the lead wears, the piston advances maintaining a constant pressure of the lead tip. This condition prevails regardless of wear rate as both the cylinder pressure and piston area are maintained constant regardless of the position of the piston in the cylinder.

To retract the lead from the recording surface the pressure on the piston is released. As the cylinder pressure approaches atmospheric pressure both the lead retaining tube and cylinder are advanced by a solenoid toward the recording medium. The lead tip is already in contact with the recording surface and thus as the solenoid advances the retaining tube and cylinder toward the recording medium the lead and piston slide into the retaining tube and cylinder respectively, an amount equal to the forward motion. When the solenoid returns to its original position frictional forces within the tube and cylinder cause both the lead and piston to move with the retaining tube and cylinder to their original position. In this manner the lead is retracted from the recording medium by an amount equal to the solenoid travel.

In accordance with another aspect of the present invention a holder is provided including a plurality of retaining tubes disposed in a predetermined pattern. With this arrangement the piston and pushrod are forceably withdrawn so that the pushrod no longer engages in the retaining tube. The holder is then rotated or moved so that the pushrod comes into alignment with another retaining tube containing a new piece of lead.

In accordance with another aspect of the present invention there is provided a similar piston and cylinder arrangement in conjunction with an ink feed system including an ink reservoir and a column of ink against which the piston and pushrod is urged.

BRIEF DESCRIPTION OF THE DRAWINGS

Numerous other objects, features and advantages of the invention should now become apparent upon a reading of the following detailed description taken in conjunction with the accompanying drawings in which:

FIG. 1 is one embodiment of the invention for use with a pencil lead;

FIG. 2A shows an alternate embodiment also for pencil lead and similar to the one shown in FIG. 1 but also including a multiple lead holder;

FIG. 2B is an enlarged view of a portion of the holder shown in FIG 2;

DETAILED DESCRIPTION

Figure 2C:
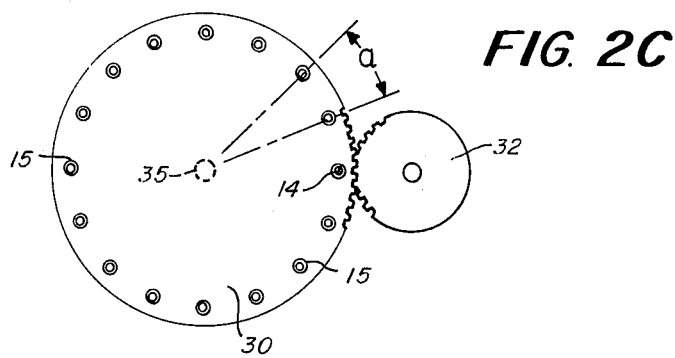
FIG. 2C is a cross-sectional view taken along line 2C—2C of FIG. 2A.

FIG. 1 depicts one embodiment of the invention using a single pencil lead as a recording material. A pressurized fluid supply 10 is attached by way of a conventional three-way valve 11 to a cylinder 13 which contains a piston 12. The area 12A above the piston 12 may communicate by operation of valve 11 with either the pressurized supply 10 or the atmosphere by way of vent 11B.

The piston 12 is mounted to a pushrod 16 which has one end inside the retaining tube 15. This retaining tube contains the pencil lead 14. If pressure is applied to the piston by means of the operation of valve 11 this pressure is transmitted from the piston through the connecting rod 16 to the pencil lead 14. The valve 11 may be operated electrically from leads 11A. The pencil lead is advanced until it contacts the recording medium 17 which is supported by supporting surface 19. The force on the lead tip is a product of the supply pressure and the piston area and the pressurized fluid supply 10 may be adjusted depending upon the type of lead used or other conditions.

In use, either the recording medium is moved under the lead or the lead feeding mechanism is moved over the recording medium. In either case, as motion proceeds the lead wears and becomes shorter. As this wearing occurs the lead is continuously kept in constant pressure contact with the recording medium. As the lead wears, the piston moves down the cylinder.

In the embodiment shown in FIG. 1 it is also desirable to provide an indication when the lead is nearly expended. For this purpose there is provided a light source 21 which is attached to the cylinder 13 and extends preferably through a hole in the side of the cylinder as shown in FIG. 1. A photo-sensitive detector 20 is disposed on the other side of the cylinder in an opposite hole. When the lead is of reasonable length the piston is high enough in the cylinder so that light from source 21 activates detector 20. As the lead length wears below a predetermined length the piston advances down the cylinder until it passes between the light source and detector. When this occurs the detector no longer is activated. This condition is sensed by techniques well known in the art to establish an excess wear condition.

In accordance with the present invention and in order to construct a practical apparatus, it is necessary that contact between the lead and the recording medium be selectively interrupted. To break contact or retract the lead, the valve 11 is operated so that the pressurized supply is no longer connected to the cylinder. When the valve 11 is operated to this new state then the pressure on the piston is relieved. Thereafter, solenoid 18 is energized. Solenoid 18 may be a push-type electrical solenoid or pneumatic cylinder or similar device to accomplish the required task. The frame of solenoid 8 is attached to a frame reference ground. When solenoid 18 is energized it pushes against the bias of spring 22 and interconnecting member 23 causes the cylinder 13 to move in unison with the output shaft of the solenoid. The retaining tube 15 which is connecting to the bottom end of the cylinder also moves in the downward direction as depicted in FIG. 1. Thus, the cylinder and lead retaining tube are both advanced toward the recording medium as the lead is already in contact with the recording surface and the pushrod and piston in turn are in contact with the lead. The lead retaining tube and cylinder must slide down over the lead by an amount equal to the travel of the solenoid. The only forces applied to the lead, pushrod and piston at this time are low frictional forces as the cylinder is subjected to only atmospheric pressure by way of valve 11.

When the solenoid is deactivated the spring 22 returns the solenoid, cylinder 13 and retaining tube 15 to their original position. Because of the frictional forces previously mentioned, the lead, rod 16 and piston 12 travel with the cylinder and retaining tube. The lead tip is thus removed from contact with the recording medium by an amount equal to the solenoid travel.

Because of rapid lead wear it is desirable to provide a method of using multiple leads in a preferred embodiment. FIG. 2A shows an apparatus for accomplishing this which allows multiple leads to be used without manual intervention. In FIG. 2A like reference characters have been used to identify the parts that are the same as those shown in FIG. 1. In FIG. 2A the pressure applying means, cylinder, piston, rod and short lead detector are similar to those depicted in FIG. 1.

In FIG. 2A the cylinder 13 has been modified to include a bottom fluid input port 24 for preferably coupling compressed air from the fluid supply 10 by way of a second valve 25 to the bottom section 12B of the cylinder. Also, the lead retaining tube 15 shown in FIG. 1 has been replaced by a plurality of such tubes arranged in a predetermined pattern which is a circular pattern shown in FIG. 2 and identified as an indexing assembly 27 comprised of a top-plate 28 a plurality of lead retaining tubes 15, a lower plate and gear 30, gear 32, stepping motor 34, and shaft 35. The lead retaining tubes 15 serve the same purpose as previously explained with respect to the embodiment shown in FIG. 1. Stepping motor 34 is coupled to and directly rotates gear 32 which in turn meshes and rotates bottom plate and gear 30. By selective operation of stepping motor 34 by electrical signals the assembly 27 is rotated about shaft 35 which may extend between plate 28 and plate 30. The retaining tubes 15 are located on the circumferential line passing directly under pushrod 16. The stepping motor step angle is designed along with the gears so that the stepping motor will rotate the assembly 27 through an angle $a$ for one or more steps of the motor. Under static conditions, of course, only one retaining tube is located directly under the pushrod 16.

In operation, pressure is applied to piston 12 by way of valve 11 as previously explained so as to push the piston 12 and its connected pushrod 16 downwardly. As indicated in FIG. 2B the rod 16 enters the upper end of the retaining tube 15 which is positioned under the rod, until contact is made with the lead 14. The lead is then pushed down until it contacts the recording medium 17. The retraction of the lead from the surface is accomplished in basically the same fashion as discussed with reference to FIG. 1. The plunger of solenoid 18 is connected by way of members 23 and 36 to the cylinder 13 and the lead indexing assembly 27, respectively. Activation of solenoid 18 causes the cylinder 13 and assembly 27 to move down toward the recording medium as previously explained, because the lead is against the recording medium it, as well as the rod and piston, push up into the lead retaining tube and cylinder. When the solenoid deactivates, the assembly 27 and cylinder are returned to their normal position by spring 22 moving the lead away from the recording medium. This cycle of operation continues as required by operation of valve 11 and activation of solenoid 18 until the "low lead" detector which comprises light source 21 and photo-sensitive detector 20 senses that the piston has travelled to a predetermined position close to the bottom of the cylinder. On the completion of the next lead retraction operation by means of suitable control circuitry well known to those versed in the art, valve 25 is activated. Valve 25 may be controlled by means of input electrical control leads 25A. Valve 25 may be identical to valve 11 and also includes a venting port 25B. When valve 25 is operated pressure is applied from supply 10 to the lower side 12B of the cylinder and against the bottom end of piston 12 causing the piston and its connecting rod 16 to move upward in the cylinder 13. The operation of valve 25 may be for a relatively short period until the rod 16 has been removed from the lead retaining tube 15. When the rod is clear of the retaining tube a single or multiple pulses are applied to the stepping motor 34 causing the motor by way of the gearing arrangement shown in FIG. 2C to rotate the indexing assembly 27 through the angle $a$. This places a new lead retaining tube and a new piece of lead under rod 16. The normal activation and retracting cycle for recording may now be resumed. The cycles of operation under proper programming control may continue unattended until all of the lead in the assembly 27 has been exausted. One system in which the apparatus of the present invention may be used is the system shown in my copending application Ser. No. 395,822, now U.S. Pat. No. 3,873,769.

In one application a pyroelectric stylus is used for recording by contact with a sensitized paper. This type of a stylus is a thin wire through which a current is passed to cause recording on the sensitized medium. The operating requirements for the stylus are similar to the pencil lead described above. The stylus is to be maintained in constant pressure contact with the recording medium and must also be retracted from the recording medium. The retraction of the stylus in this case may be considered a long stroke. To accomplish long stroke retraction, the stylus is physically tied to the piston and the retraction is accomplished by use of the second valve as shown in FIG. 2A as valve 25.

Figure 3A:
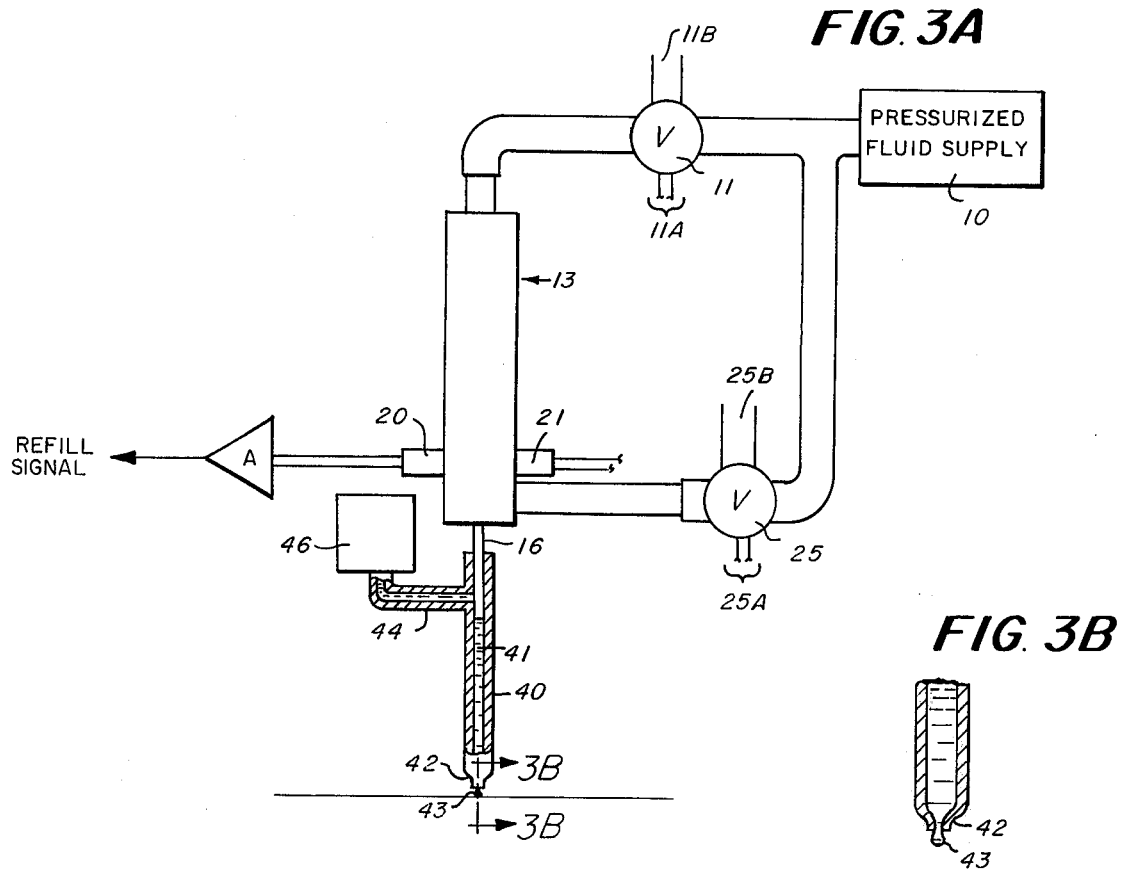
FIG. 3A shows another embodiment of the invention for use with an ink recording material.
Figure 3B:
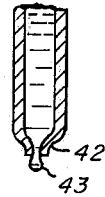
FIG. 3B is an enlarged view of a portion of the apparatus shown in FIG. 3A.

Other recording materials may also be used with the principals of the present invention such as inks or viscous pastes. FIG. 3A shows an embodiment which may be used for liquid or ink recording. In FIG. 3A like reference characters have been used for identical parts to those shown in FIGS. 1 and 2A. In FIG. 3 the cylinder and piston arrangement and the pushrod 16 may be identical to those shown in FIGS. 1 and 2A. Also, the means for sensing the position of the piston may also be of the same type as shown in FIGS. 1 and 2A. In FIG. 3A instead of the lead retaining tube there is provided a fluid tube 40 having the pushrod 16 extending into the top end thereof. The tube 40 terminates in a small orifice 42 shown more clearly in the enlarged view of FIG. 3B. This embodiment also includes a side tube 44 coupling between tube 40 and a fluid or ink reservoir 46. When the valve 11 is energized the piston in cylinder 13 moves the pushrod 16 in contact with the liquid column 41. The pressure is transmitted through this liquid column causing a miniscus 43 to form at the end of orifice 42. This miniscus contacts the recording medium and causes the recording material to flow onto the recording medium. The flow rate is controlled by the pressure on the column 41 as well as any viscous damping which may be applied to the piston.

The pushrod 16 cannot be drawn away from the recording material because in doing so there would be created a low pressure pocket between the rod tip and the column 41. Thus, when it is necessary to remove contact from the writing surface a short pulse of pressurized fluid is applied by controlling valve 25. This is applied to the lower side of the piston 12, moving the piston and connecting rod up a short distance. Because of the low pressure condition which exists when the connecting rod begins to lose contact with the column 41, the miniscus 43 will be drawn back into the tip, out of contact with the medium. Reapplication of pressure to the upper side of the piston forms the miniscus and allows writing to proceed.

When the low level detector 20 senses that the piston is in its lower predetermined position valve 25 is energized. This energizing of valve 25 is for a longer period than when just withdrawing the miniscus so that the cylinder and connecting rod move to a point above the feed tube 44. When this happens an additional supply of recording material is fed into the column 41 from reservoir 46. Valve 11 may then be energized to begin a new writing cycle.

Having described a limited number of embodiments of the present invention is should now become apparent to those skilled in the art that there are numerous other embodiments and modifications of the ones disclosed herein all of which are contemplated as falling within the spirit and scope of the present invention.

What is claimed is:

1. An apparatus for writing or marking on a medium by means of an expendable piece of recording material said apparatus comprising;

means for retaining and guiding the piece of recording material having one end from which the piece of recording material is expelled, movable means including means contacting the piece of recording material and means for selectively urging the contacting means, means for commonly supporting said retaining means and movable means, said means for selectively urging being operable to urge the contacting means against the recording material and to interrupt the urging force preparatory to retracting the piece, and means for retracting the piece from contact with the medium comprising bidirectional means connecting to said supporting means and means for selectively operating said bidirectional means to move said supporting means and retaining means toward the medium and relative to the stationary piece to thereby cause the piece to be retracted into the retaining means, and to thereafter move said supporting means and retaining means away from the medium to retract the piece from contact with the medium.

2. An apparatus for writing or marking on a medium by means of an expendable piece of recording material, said apparatus comprising:

a supply of pressurized fluid which may be maintained at a constant predetermined pressure, movable means having means contacting the piece of recording material, means for retaining the piece of recording material having one end from which the piece of recording material is expelled and another end for receiving the contacting means, support means for the movable means and including means for receiving the fluid, means selectively operable to couple the pressurized fluid to the support means for urging the contacting means against the material, and to uncouple the pressurized fluid preparatory to retracting the piece from contact with medium, and means for retracting the piece from contact with the medium comprising bidirectional means connecting to said supporting means and means for selectively operating said bidirectional means to move said supporting means and retaining means toward the medium and relative to the stationary piece to thereby cause the piece to be retracted into the retaining means, and to thereafter move said supporting means and retaining means away from the medium to retract the piece from contact with the medium.

3. The apparatus of claim 2 wherein said support means includes a cylinder and said moveable means includes a piston slideable in the cylinder, the fluid being applied against one end of the piston and the means contacting extending from the opposite end of the piston.

4. The apparatus of claim 3 wherein said cylinder has another means for receiving pressurized fluid and means for selectively coupling the fluid to said another means for withdrawing the contacting means.

5. The apparatus of claim 2 wherein said retaining means includes a multiple material retaining means, and second means selectively operable to move the contacting means away from the recording material and out of the retaining means.

6. The apparatus of claim 5 including selection means operable after the contacting means has withdrawn from the retaining means to register a new recording material with the contacting means.

7. The apparatus of claim 2 wherein the recording material includes a pencil lead.

8. The apparatus of claim 2 wherein the recording material includes an electronic stylus.

9. Apparatus for writing or marking on a medium by means of a marking material, said apparatus comprising;

means for retaining in spaced relationship a plurality of individual pieces of said marking material, means contacting one of said pieces of marking material for urging the piece of marking material against the medium, means for supporting said contacting means, means for selectively applying a constant pressure to said contacting means to in turn apply a constant pressure to the marking material, means for withdrawing the piece from contact with the medium comprising means for selectively moving said supporting means and retaining means toward the medium to retract the piece into the retaining means, and away from said medium to withdraw the marking material from the medium, means for detecting the expending of the piece being used for writing or marking, means responsive to said detecting means for retracting said contacting means out of said retaining means, and means responsive to retraction of said contacting means for moving said retaining means so that said contacting means is in alignment with another piece of marking material.

10. The apparatus of claim 1 wherein said retaining means comprises a holder including a plurality of retaining tubes for accommodating individual pieces of marking material, said marking material being of elongated rigid shape.

11. The apparatus of claim 10 wherein said means contacting the marking material includes an elongated push rod of approximately the same cross-sectional size as the elongated marking material and in alignment with the marking material.

12. The apparatus of claim 10 wherein said means for moving said retaining means includes a stepping motor and gear arrangement, said retaining tubes being arranged along a circular locus.

13. The apparatus of claim 9, including means for detecting the expending of the marking material by detecting the position of said contacting means relative to said supporting means.

14. The apparatus of claim 9 wherein said retaining means and supporting means are constructed in one piece and move together.

15. The apparatus of claim 14 wherein said means for selectively moving said support means and retaining means includes bidirectional rectilinear motion means connecting to said supporting means and means for energizing said motion means after pressure is removed from said contacting means to move in a first direction to cause said retaining means to move relative to the stationary marking means, and thereafter to move in the opposite direction to retract the retaining means, supporting means and marking material away from the medium.

16. The apparatus of claim 9 wherein said marking material includes a lead or graphite rod.

17. The apparatus of claim 9 wherein said means for applying a constant pressure includes a fluid source.

18. The apparatus of claim 17 wherein said means contacting the marking material includes a piston and push rod which is in alignment with the marking material, said rod and material being of about the same cross-sectional size and both being elongated, said fluid source directing fluid against said piston to urge said push rod against said marking material.

19. The apparatus of claim 18 wherein said means for supporting includes a cylinder in which said piston moves.

20. The apparatus of claim 19 including first means for selectively controlling said fluid source to move said push rod against said marking material, and second means for selectively controlling said fluid source to retract said push rod from contact with said marking material.

21. The apparatus of claim 20 wherein said first means coupled to one end of said cylinder for moving the piston in one direction, and said second means coupled to the other end of said cylinder for moving the piston in the opposite direction.

* * * * *